3,080,375
ACID MILLING OF PHTHALOCYANINE PIGMENTS
Leon Katz, Springfield, N.J., assignor to General Aniline & Film Corporation, New York, N.Y., a corporation of Delaware
No Drawing. Filed Oct. 20, 1959, Ser. No. 847,454
8 Claims. (Cl. 260—314.5)

The present invention relates to a process for conditioning phthalocyanine pigments, and more particularly to an acid milling procedure which provides phthalocyanine pigments of pleasing and improved shades, brilliance and/or strength and whose particle size, particle size distribution, and particle surface characteristics render them exceedingly suitable for pigmentation of coating and printing compositions, self-supporting films and other solid bodies and the like, and to the pigments produced by such procedure.

In U.S. Patent No. 2,716,649 there is disclosed and claimed a process for conditioning phthalocyanine pigments comprising milling with forces predominantly shearing in nature a mixture comprising a phthalocyanine pigment and a quantity of sulfuric, chloroacetic, phosphoric, chlorosulfonic or lower alkyl sulfonic acid sufficient to produce with the pigment a doughy, kneadable mass, and drowning the resulting milled mixture in water. That process enables the attainment of highly desirable results. It eliminates many of the disadvantages attributable to the prior conventional methods of acid pasting involving dilution with water of a sulfuric acid solution of the pigment, which require large amounts of acid entailing increased initial costs, cost of equipment, corrosion and disposal problems, and the like. Said process also greatly shortens the treatment time, produces a presscake with a relatively high solids content, and is applicable to pigments which are unstable to conventional acid pasting.

While the process of said patent is satisfactory in most instances, the products produced thereby sometimes do not have the shades, brilliance, strength and/or other properties found highly desirable for certain purposes. Further, the acids employed in such process and in the conventional sulfuric acid pasting processes and the like raise problems of corrosion and the like.

It is an object of this invention to provide a process which will have substantially all of the advantages of the process described in said patent and which will produce phthalocyanine pigments having improved shades, brilliance and/or strength, soft-grinding powders from the presscakes and the like. Other objects and advantages will appear as the description proceeds.

The above objects are attained by the instant invention which is directed to a process comprising milling with forces predominantly shearing in nature a mixture, in the form of a doughy, kneadable mass, comprising a phthalocyanine pigment and about 0.5 to 5 parts by weight per part of said pigment of an aromatic sulfonic acid, and then diluting the milled mixture with water. The thus conditioned pigment is then recovered from the aqueous mixture in known manner, as by filtration, centrifugation, decantation, or the like and washed acid free.

The process of this invention is suitable for the conditioning of any phthalocyanine pigment produced in any desired manner, such as metal-free phthalocyanine, metal phthalocyanines, such as copper, nickel, cobalt, zinc and lead phthalocyanines, and brominated, chlorinated and mixed chlor-brom derivatives thereof. As examples of such brominated and chlorinated derivatives, there may be mentioned chlorophthalocyanine,
bromophthalocyanine,
polychlorophthalocyanine,
polybromophthalocyanine,
monochloro copper phthalocyanine,
polychlorinated copper phthalocyanine containing up to 16 chlorine atoms, monobromo copper phthalocyanine, polybrominated copper phthalocyanine containing up to 16 bromine atoms, and mixed brominated-chlorinated copper phthalocyanines containing at least one atom each of bromine and chlorine. The phthalocyanine moiety may also be nuclearly substituted with nitro, amino, thio, oxy, carbonyl, alkoxy, aryl, aryloxy, and other groups.

The aromatic sulfonic acids employed in the instant invention are well known, those preferred being of the aryl monocarbocyclic sulfonic acid type as exemplified by benzene sulfonic acid and its hydroxy, chloro, and alkyl nuclearly substituted derivatives such as phenol sulfonic acid, p-chlorbenzene sulfonic acid, o-, m- and p-toluene sulfonic acid, xylene sulfonic acid, ethylbenzene sulfonic acid, dodecylbenzene sulfonic acid and mixtures thereof, and the like.

Among these, the toluene sulfonic acids, particularly the paraisomer or a mixture of the o-, m- and p-isomers containing the para isomer in major proportions, are preferred as yielding optimum results. Such mixtures are commercially available and generally contain about 80–90% of the para isomer, 10–20% of the ortho isomer and 1–7% of the meta isomer, and are intended to be included within the scope of the term "commercial toluene sulfonic acid" as employed herein and in the appended claims. Other aromatic sulfonic acids may, however, be employed, including naphthalene sulfonic acid and its nuclearly substituted mono- and di-hydroxy and -lower alkyl (e.g. methyl, ethyl, butyl) derivatives. These aromatic sulfonic acids are preferably employed in substantially 100% concentration although lower concentrations down to about 75% may be employed since the presence of this small amount of water in the mixture being milled is not detrimental to the attainment of the desired results. Such acids should be liquid under the milling conditions of the present invention.

In carrying out the process, the quantity of acid employed should be that necessary to produce with the pigment a doughy, kneadable mass. The particular quantity of acid which will give this result can be readily determined by routine experimentation. If the quantity is too small, the pigment does not wet out properly, while too great a quantity of acid does not allow adequate shearing and leads to lumpy masses in which the acid does not contact all pigment particles. As stated, the quantity of acid employed will generally fall within the range of about 0.5 to 5 and preferably about 1 to 2.5, parts by weight per part of pigment.

The particular apparatus used for effecting the milling of the pigment-mass must be one capable of exerting a substantially uniform shearing action throughout the mass. It is preferred to use a Werner-Pfleiderer type of kneading mill, but Banbury mixers or other kneading apparatus or dough mixers may be employed which operate by other mechanisms provided that they operate to exert a uniform shearing force on the mixture being milled. Generally, when low powered milling equipment is employed, higher proportions of aromatic sulfonic acid to pigment, within the required range, e.g. about 3 to 5:1, should be employed, while the lower proportions within said range may be employed when using high powered milling equipment. It should, however be understood that the proportion of acid to pigment in any particular instance is not solely dependent upon the type of milling equipment employed, but is also dependent upon the nature of the pigment and acid, temperature and duration of milling, and the results desired with respect to shade, strength, brilliance, particle size and other characteristics, and the like.

The temperature and duration of milling are not critical except of course that in any particular instance, a specific temperature and duration of milling, readily ascertainable by routine experimentation, may be necessary to achieve optimum results. Generally, the temperature may vary between room temperature and about 115–125° C. and the duration of milling may range from about ½ to 10 or 12 hours. A longer milling may in some cases be necessary or desirable but the process can in any particular instance be controlled by periodic examination of a sample of the mass microscopically to ascertain when a product having the desired particle characteristics and the like has been obtained. Other tests may be employed for determining the conditions necessary for optimum strength, shade and brilliance of the product.

Following completion of the milling operation, the milled mixture is diluted with water as by drowning. The water may be added to the milled mixture or vice versa. The pigment is then isolated from the aqueous mixture in known manner, usually by filtration. In some instances it may be desirable to add metal salts, such as those of Ba, Ca, Mg and Al, to the drowned reaction in order to isolate a laked pigment. This is particularly helpful when long chain alkyl aromatic sulfonic acids are used.

If desired, the milling in accordance with this process may be carried out in presence of up to 5 parts of a water-soluble inorganic salt such as sodium or potassium sulfate, phosphate, acid sulfate or acid phosphate and/or up to 0.2 part of a benzenoid organic liquid such as nitrobenzene, xylene or o-di-chlorobenzene, per part of pigment. Similarly, said aromatic sulfonic acid may contain up to 25% by weight thereof of sulfuric acid or the like, although it will be understood that such addition will pro tanto tend to reduce the anti-corrosive effects of the instant process.

The use of the present aromatic sulfonic acids alone in the milling process reduces or eliminates obnoxious odors in the final pigment which might arise through the use of non-sulfonated aromatic solvents. Other advantages of the instant process have been pointed out above, such advantages including or enabling ease of handling, increased size of batches, increased presscake solids content, increased safety, reduced disposal problems, softer powders and improved particle size, particle size distribution and particle surface characteristics.

Yellowness has always been a desirable and elusive quality in the polychlorinated copper phthalocyanine green pigments of commerce while on the other hand, a bluer shade of green has presented no problem. This is because a bluer shade of green is easy to obtain by reducing the degree of chlorination or by blending a fully chlorinated copper phthalocyanine green with the unsubstituted copper phthalocyanine blue. Attempts to force the conventional polychlorinated copper phthalocyanine green to a yellower shade by blending with other pigments and/or known conditioning methods almost invariably cause a loss of brightness and color strength or tinting power. A notable step has recently been taken towards producing a yellow shade of copper phthalocyanine green by substituting one or more of the chlorine atoms in the pigment with one or more bromine atoms. Such brominated-chlorinated copper phthalocyanine greens containing a total of at least 12 bromine and chlorine atoms at least one and up to 12 of which are bromine atoms, have been surprisingly found to have a highly desirable yellow shade of green. In such brominated-chlorinated copper phthalocyanines, the degree of yellowness varies directly with the degree of bromine substitution, but with a corresponding decrease in brightness and color strength or tinting power (though not as great a decrease as has been met with in previous attempts to inject yellowness into the commercial copper phthalocyanine greens).

The process of this invention has been found to yield surprising shifts of the green shade of polychlorinated copper phthalocyanine pigments containing for example 14–16 chlorine atoms, to the yellow side. In addition, the present process, when employed for conditioning brominated-chlorinated copper phthalocyanine greens, has been found to yield a surprising relative increase in the brightness and/or color strength or tinting power of such pigments even with an increasing degree of bromine substitution.

Similarly improved results may also be obtained by treatment of any of the phthalocyanine pigments referred to hereinabove in accordance with the process of this invention.

The changes in the chemical and/or physical properties in the pigments produced by the above described process of the present invention, as compared with prior art pigments, to which may be attributed the described improved and superior pigmentary properties are not fully known or clearly understood. It is however, apparent that the present pigments must differ in some manner in particle size, particle shape, particle nature, particle surface characteristics, dispersion of such properties throughout the pigment mass, or the like, or a combination thereof, from the prior art pigments. Such pigments produced by the process of this invention are, as stated, regarded as novel and inventive.

The following examples, in which parts are by weight unless otherwise indicated, are illustrative of the instant invention and are not to be regarded as limitative.

*Example 1*

70 parts of crude copper phthalocyanine and 100 parts of p-toluenesulfonic acid are charged into a kneading machine. The resultant mixture is kneaded for 3 hours at a temperature of 65–70° C. The milled magma is then discharged into 1400 parts of water, stirred until a smooth slurry is obtained and the pigment recovered by filtration, and washed with water until the filtrate is neutral to Congo red paper.

The bright blue pigment thus obtained is suitable for incorporation into textile printing inks or upon drying is useful in printing inks, plastics and rubber. The dry powder is superior in softness to copper phthalocyanine conditioned by conventional acid pasting methods or by the process of U.S. 2,716,649.

*Example 2*

The procedure of Example 1 is repeated, but applied to 70 parts of a crude partially chlorinated copper phthalocyanine containing 4–5% chlorine. Similarly improved results are obtained.

*Example 3*

A mixture of 60 parts of crude copper phthalocyanine and 90 parts of p-toluene sulfonic acid is milled in a kneading apparatus for 2 hours at 100° C. The conditioned pigment mass is drowned into 1600 parts of water. After agitation of the aqueous mixture to produce a smooth slurry the pigment is separated by filtration and washed with water.

The pigment is a bright blue, redder in shade than that obtained in Example 1. The pigment can be utilized in all the conventional pigment applications known for copper phthalocyanine.

Example 4

A mixture of 220 parts of crude hexadecachloro copper phthalocyanine and 110 parts of p-toluene sulfonic acid is kneaded for 2 hours at 45–55° C. The resultant mass is thinned with 150 parts of 96% sulfuric acid, drowned into 6000 parts of water, filtered, and the cake washed acid free. The recovered dry pigment is much yellower and softer than hexadecachloro copper phthalocyanine conditioned by conventional acid pasting methods or by the process of U.S. 2,716,649.

Example 5

A mixture of 100 parts of crude hexadecachloro copper phthalocyanine and 100 parts of a commercial grade of toluene sulfonic acid containing approximately 80% of the para, 15% of the ortho and 5% of the meta isomers is kneaded for 6 hours while slowly raising the temperature to 110° C. The mass is drowned into 2500 parts of warm water and heated to a boil. The pigment is recovered by filtration and washing. It thas improved properties comparable to those of the product of the previous example.

Example 6

The procedure of Example 5 is repeated except that only 60 parts of the commercial toluene sulfonic acid mixture is used. The resulting pigment is similar to the pigment of Example 5.

Example 7

The procedure of Example 1 is repeated except that the p-toluene sulfonic acid is replaced by the commercial toluene sulfonic acid mixture described in Example 5. The resulting pigment is similar to that produced in Example 1.

Example 8

A mixture of 100 parts of crude hexadecachloro copper phthalocyanine and 200 parts of said commercial toluene sulfonic acid mixture is kneaded for 6 hours while gradually raising the temperature to 95° C. The pigment when isolated by drowning, filtration and drying is a soft powder having a strong, bright, yellowish shade of green.

Example 9

One hundred parts of a previously conventionally acid pasted hexadecachloro copper phthalocyanine are kneaded with 80 parts of p-toluene sulfonic acid for 45 minutes while raising the temperature to 115° C. The conditioned pigment is isolated by drowning in 2500 parts of water, filtering and washing. The dry pigment is much softer and yellower than the starting material and has good strength and brightness.

Example 10

The procedure of Example 9 is repeated, but applied to 100 parts of a hexadecachloro copper phthalocyanine previously conditioned by the process described in U.S. 2,716,649. Improved results are obtained similar to those described in Example 9.

Example 11

Equal parts of a hexadecachloro copper phthalocyanine pigment and said commercial toluene sulfonic acid mixture are kneaded for three hours at 105–115° C. The pigment when isolated after this treatment by drowning, filtration and drying is very much softer and yellower than the same pigment conditioned by conventional acid pasting methods or by the process of U.S. 2,716,649 and has good strength and brightness.

Example 12

100 parts of a crude polyhalogenated copper phthalocyanine containing 16.5% bromine and 34.3% chlorine with a molecular weight of 1140 and 200 parts of xylene sulfonic acid are mixed in a dough mixer for 10 hours during which time the temperature is gradually raised to 90° C. The charge is dumped into 4000 parts of water and stirred until the mass is broken up and gives a uniform slurry. This requires about 1 hour. Then the pigment is isolated by filtering and washing with water until the pH of the wash is above 5. The cake is dried at 90° C.

The resulting pigment is a soft yellow green pigment with excellent brightness and good strength when incorporated into an aqueous textile printing emulsion or an organic synthetic polymeric composition such as a vinyl chloride floor tile.

Example 13

The procedure of Example 12 is repeated except that the xylene sulfonic acid is replaced by a commercial grade of toluene sulfonic acid containing about 85% of the para isomer and about 15% of the ortho isomer with small amounts of the meta isomer, water, sulfuric acid, toluene and other impurities.

The resulting pigment when compared to the pigment of Example 12 is definitely yellower in shade and considerably stronger.

Example 14

The procedure of Example 12 is repeated except that the 200 parts of xylene sulfonic acid is replaced by 50 parts of xylene sulfonic acid and 150 parts of the commercial toluene sulfonic acid mixture of Example 13.

The resulting pigment is stronger and yellower than the pigment of Example 12, being essentially equal to the pigment of Example 13.

Example 15

30 parts of a crude copper phthalocyanine containing 15.4% bromine and 35.8% chlorine is mixed with 60 parts of the commercial toluene sulfonic acid mixture of Example 5 in a Werner-Pfleiderer mixer having two so-called sigma type blades which revolve at 15 r.p.m. and 30 r.p.m.

Mixing is continued for five hours during which time the temperature is gradually raised to 110° C.

The pigment is isolated by drowning the mass into 2000 parts of water, filtering, washing and drying at 110° C. The resulting pigment is as strong as a commercial poly chlor copper phthalocyanine pigment but is so yellow as to be outside of the normal limit of accurate color comparison. It is estimated to be at least twice as yellow as is normally described as "much" because when it is mixed with equal parts of the prior-art polychlor copper phthalocyanine green, the blend is rated by a skilled color technologist as being "much yellower" than the commercial phthalocyanine green standard.

Example 16

The procedure of Example 15 is repeated except that for the 60 parts, 90 parts of the toluene sulfonic acid mixture is employed, mixing is carried out for the initial 5 hours at a temperature below 50° C., and then the temperature is raised gradually to 90° C. over an additional hour of mixing.

This pigment has a degree of yellowness between that of the product of Example 15 and the commercial poly chlor phthalocyanine green but is 8% stronger than either.

Example 17

3000 grams of a crude poly halogenated copper phthalocyanine containing 31.8% bromine and 25.7% chlorine with a molecular weight of 1315 is mixed with 5500 grams of the toluene sulfonic acid mixture of example 15 in a 3 gallon heavy duty mixing machine. Mixing is carried on for 4 hours while the temperature is slowly raised to 95° C.

The pigment is isolated by drowning the charge into water with vigorous agitation followed by filtering, washing and drying.

This pigment is evaluated as being at least four times the degree of yellowness described as "much yellow" when compared to a commercial poly chlor copper phthalocyanine green standard because a blend containing 3 parts of the standard and 1 part of this pigment is judged by a skilled color technologist to be "much yellower" than standard.

*Example 18*

2500 pounds of a crude polyhalogenated copper phthalocyanine containing 26.6% bromine and 28.9% chlorine and having a molecular weight of 1260 is mixed with 6750 pounds of essentially pure para toluene sulfonic acid in a heavy duty mixing machine with a capacity of 500 gallons. Very intensive mixing is carried out for 3 hours with efficient cooling so as to keep the charge temperature below 50° C. The charge is then drowned in water, filtered, washed and dried.

The resulting pigment is very much yellower than the well known poly chlor copper phthalocyanine green of commerce and is essentially of equal strength insofar as colors of such different shades can be compared.

*Example 19*

10 g. of a crude polyhalogenated copper phthalocyanine containing about 3 atoms of bromine and 11.4 atoms of chlorine with a molecular weight of 1200 is mixed with 50 g. of a mixture of 10% benzene sulfonic acid and 90% commercial toluene sulfonic acid mixture.

The mixer used is a belt driven laboratory agitator with an "anchor" type glass stiring paddle. The mixture is stirred for 2 hours after which the mass becomes too heavy for good mixing. The charge is dumped into 1000 cc. of water and stirred and heated to 80° C. over a period of 2 hours. The pigment is isolated by filtering, washing and drying. The yield is 9.5 g. of a yellow-green pigment of approximately the same shade and strength of the product obtained in Example 16.

*Example 20*

100 parts of a crude polyhalogenated copper phthalocyanine containing 52.7% bromine and 11.2% chlorine which corresponds to a molecular weight of 1550 is kneaded with 250 parts of the commercial toluene sulfonic acid mixture of Example 13. Mixing is carried out with cooling water in the jacket of the mixing machine for a total of 10 hours. The mass changes to a heavy plastic mass. The flow of cooling water is reduced during the last two hours so as to allow the charge to warm up to 90° C.

The pigment when isolated is of an exceedingly yellowish shade of green. When mixed into a plastic film such as can be obtained by intensive hot mixing with a commercial polyvinyl compound, a plasticizer such as dioctyl phthalate plus extending or opacifying pigments and small amounts of various modifying additives such as are well known to plastic technologists, the pigment of this example shows a dramatic degree of yellowness and such good strength as to be approximately the same strength as is obtained with poly-chlor copper phthalocyanine green as nearly as can be judged between colors of such different shades. Contrary to the experience of previous technology, the plastic film with this new yellowish green pigment does not appear dull or dirty but in fact has an eye-catching brilliance or brightness so as to make the prior art pigment appear to be a dull and unattracitve bluish color by contrast.

*Example 21*

30 g. of a crude polyhalogenated copper phthalocyanine containing 60.5% bromine and 5.0% chlorine with a molecular weight of 1600 is mixed with 65 g. of the commercial toluene sulfonic acid mixture of Example 13 for 7 hours in a heavy duty mixer. After drowning in water, filtering, washing and drying, the pigment is found to have an extreme yellowish shade of green.

*Example 22*

100 parts of a crude pigment base consisting of a poly brom-chlor copper phthalocyanine with 1 atom of bromine and 14 atoms of chlorine is kneaded with 100 parts of said commercial toluene sulfonic acid mixture of the preceding example. Mixing and kneading is continued for 4 hours. The pigment when isolated as above is yellowish green with shade and strength approximately equal to the product of Example 14.

*Example 23*

100 parts of crude polychlorocopper phthalocyanine containing over 14 Cl atoms, and 150 parts of dodecyl benzene sulfonic acid are mixed in a heavy duty mixing machine for 2 hours, after which the charge is heated to 90° C. and mixed for 1 hour more. The charge is then cooled while mixing, and discharged into 2000 parts of water and mixed to give a fine dispersion.

55 parts of barium chloride are next added to break the dispersion followed by 120 parts of blanc fixe, to give a composition containing 25% pigment.

The reduced color or pigment lake is isolated by filtering, washing and drying. The product is a bright green powder suitable for tinting floor tiles.

*Example 24*

Example 23 is repeated using diisopropyl naphthalene sulfonic acid in place of the dodecyl benzene sulfonic acid. A similar product is obtained.

The crude copper phthalocyanine conditioned in the above examples is obtained by the so-called urea process, as described for example in U.S. 2,197,458, wherein an intimate mixture of phthalic anhydride, urea, copper salt and oxidation catalyst is heated in a high boiling solvent until the crude pigment is formed. The chlorinated crude copper phthalocyanine is prepared by treatment of the crude copper phthalocyanine with gaseous chlorine in an eutectic mixture of aluminum chloride and sodium chloride. The crude brominated chlorinated copper phthalocyanine may be prepared by treatment of the crude copper phthalocyanine in an eutectic mixture of aluminum chloride and sodium chloride with sufficient gaseous bromine to achieve the desired amount of bromine substitution, and then with sufficient gaseous chlorine to achieve the desired amount of chlorine substitution. It will, however, be understood that the instant process is applicable to phthalocyanine pigments prepared in any other desired manner.

This invention has been disclosed with respect to certain preferred embodiments, and there will become obvious to persons skilled in the art various modifications, equivalents or variations thereof which are intended to be included within the spirit and scope of this invention.

This application is a continuation-in-part of my co-pending application Serial No. 668,292, filed June 27, 1957, now abandoned.

I claim:

1. A process comprising milling with forces predominantly shearing in nature, a mixture consisting essentially of
   (1) a phthalocyanine pigment,
   (2) 0 to 5 parts of a water-soluble inorganic salt selected from the group consisting of the sulfates, phosphates, acid sulfates and acid phosphates of sodium and potassium, per part of said pigment, and
   (3) an amount of an aryl carbocyclic sulfonic acid within the range of about 0.5 to 5 parts per part of said pigment and sufficient to yield a doughy kneadable mass, and then diluting the milled mixture with water.

2. A process as defined in claim 1 wherein said aryl sulfonic acid is a mixture of ortho, meta and para isomers of toluene sulfonic acids containing the para isomer in major proportions.

3. A process as defined in claim 1 wherein said aryl sulfonic acid is p-toluene sulfonic acid.

4. A process as defined in claim 1 in which the phthalocyanine pigment is copper phthalocyanine.

5. A process as defined in claim 1 in which the phthalocyanine pigment is polychlorinated copper phthalocyanine.

6. A process as defined in claim 1 in which the phthalocyanine pigment is a polyhalogenated copper phthalocyanine containing at least 12 halogen atoms of which at least 1 atom is bromine and the remainder is chlorine.

7. A process as defined in claim 2 in which the phthalocyanine pigment is polychlorinated copper phthalocyanine.

8. A process as defined in claim 2 in which the phthalocyanine pigment is a polyhalogenated copper phthalocyanine containing at least 12 halogen atoms of which at least 1 atom is bromine and the remainder is chlorine.

References Cited in the file of this patent

UNITED STATES PATENTS

| | | |
|---|---|---|
| 2,247,752 | Fox | July 1, 1941 |
| 2,276,860 | Niemann et al. | Mar. 17, 1942 |
| 2,716,649 | Brouillard | Aug. 30, 1955 |
| 2,833,783 | Ehrich | May 6, 1958 |
| 2,840,568 | Brouillard | June 24, 1958 |

OTHER REFERENCES

Fieser et al.: Organic Chemistry, Reinhold, New York, (1956), p. 588.